(12) United States Patent
Ronnow

(10) Patent No.: US 10,671,711 B2
(45) Date of Patent: Jun. 2, 2020

(54) APPARATUS COMPRISING A BIOMETRIC SENSOR

(71) Applicant: Nokia Technologies Oy, Espoo (FI)

(72) Inventor: Troels Ronnow, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 169 days.

(21) Appl. No.: 15/746,119

(22) PCT Filed: Jul. 22, 2016

(86) PCT No.: PCT/FI2016/050536
§ 371 (c)(1),
(2) Date: Jan. 19, 2018

(87) PCT Pub. No.: WO2017/021589
PCT Pub. Date: Feb. 9, 2017

(65) Prior Publication Data
US 2018/0211023 A1    Jul. 26, 2018

(30) Foreign Application Priority Data

Aug. 6, 2015 (EP) .................................. 15180089

(51) Int. Cl.
| | |
|---|---|
| *H04L 29/06* | (2006.01) |
| *G06F 21/32* | (2013.01) |
| *G06F 1/16* | (2006.01) |
| *H04W 12/06* | (2009.01) |
| *G06K 9/00* | (2006.01) |

(52) U.S. Cl.
CPC ............. *G06F 21/32* (2013.01); *G06F 1/163* (2013.01); *G06K 9/00885* (2013.01); *H04L 63/0861* (2013.01); *H04W 12/06* (2013.01); *G06F 2221/2139* (2013.01); *G06K 9/00906* (2013.01)

(58) Field of Classification Search
CPC ....................................................... G06F 21/32
See application file for complete search history.

(56) References Cited

U.S. PATENT DOCUMENTS

| | | | |
|---|---|---|---|
| 9,740,844 B1* | 8/2017 | Bowers ................... | G06F 21/35 |
| 9,942,222 B1* | 4/2018 | Fenton ............... | H04L 63/0853 |
| 2011/0102137 A1 | 5/2011 | Schroter ..................... | 340/5.52 |
| 2014/0085050 A1 | 3/2014 | Luna .......................... | 340/5.82 |
| 2016/0224779 A1* | 8/2016 | Kitane ..................... | G06F 21/32 |
| 2018/0018656 A1* | 1/2018 | Goldberg .............. | H04L 63/083 |
| 2018/0018669 A1* | 1/2018 | Goldberg ........... | G06Q 20/4016 |
| 2019/0116619 A1* | 4/2019 | Hauck ................... | H04W 76/10 |

FOREIGN PATENT DOCUMENTS

WO    WO 2015/051253 A2    4/2015

* cited by examiner

*Primary Examiner* — Shawnchoy Rahman
(74) *Attorney, Agent, or Firm* — Harrington & Smith

(57) ABSTRACT

An apparatus including: a biometric sensor for sensing one or more biometric parameters of a subject; a detector configured to detect one or more subject-dependent parameters; and a controller configured to initially perform a security function using the biometric sensor and subsequently perform the security function, after successful verification of the one or more detected subject-dependent parameters, without using the biometric sensor.

20 Claims, 3 Drawing Sheets

APPARATUS COMPRISING A BIOMETRIC SENSOR

TECHNOLOGICAL FIELD

Embodiments of the present invention relate to an apparatus comprising a biometric sensor and a method using a biometric sensor. In particular, they relate to an apparatus and method where the biometric sensor is used for a security function.

BACKGROUND

It is becoming more common to use a biometric signature of a subject as a way of securely identifying (authenticating) the subject. A biometric signature is a collection of biometric parameters sensed by a biometric sensor.

A strong biometric signature may be a physiological feature or collection of features which is stable, unique to a particular subject, detectable and not easily reproduced by another person. Examples of biometric signatures include, for example, an iris scan, a fingertip scan, an electrocardiogram.

One problem with using biometric signatures is that the processing of the biometric parameters to determine the biometric signature and the processing of the biometric signature to authenticate a subject can be relatively power-intensive, which can make biometric signatures unsuitable for subject authentication in low-power environments.

BRIEF SUMMARY

According to various, but not necessarily all, embodiments of the invention there is provided an apparatus comprising: a biometric sensor for sensing one or more biometric parameters of a subject; a detector configured to detect one or more subject-dependent parameters; and a controller configured to initially perform a security function using the biometric sensor and subsequently perform the security function, and after successful verification of the one or more subject-dependent parameters, without using the biometric sensor.

This has the advantage that the security function is performed initially using the biometric sensor and is then subsequently performed, after successful verification of the detected subject-dependent parameters, without using the biometric sensor.

The condition of successful verification of the one or more detected subject-dependent parameters may be a necessary condition or a necessary and sufficient condition for performing the security function without using the biometric sensor. This condition tests that the apparatus is still being used by the same subject for whom the security function was performed initially using the biometric sensor.

The energy required to perform the security function once using the biometric sensor may be greater than the energy required to detect and verify once the one or more subject-dependent parameters and subsequently perform the security function, after successful verification of the one or more detected subject-dependent parameters, without using the biometric sensor.

The detected subject-dependent parameters may be a weaker biometric signature than the biometric signature detected by the biometric sensor. For example, the apparatus may be a wearable apparatus fixed to a body part of the subject by circumscribing (closely surrounding) the body part and the one or more subject-dependent parameters may be dependent on the size and shape of the circumscribed body part.

According to various, but not necessarily all, embodiments of the invention there is provided a method comprising: enabling performance of a security function by using a biometric sensor for sensing one or more biometric parameters of a subject; detecting one or more subject-dependent parameters; enabling performance of the security function without using the biometric sensor after successfully identifying the one or more subject-dependent parameters; and enabling performance of the security function using the biometric sensor after unsuccessfully verifying the one or more subject-dependent parameters.

This has the advantage of performing the security function without using the biometric sensor when it can be successfully verified that the one or more subject-dependent parameters have not changed, implying that the subject has not changed and enabling performance of the security function using the biometric sensor after unsuccessfully verifying the one or more subject-dependent parameters which implies that the subject has changed.

BRIEF DESCRIPTION

For a better understanding of various examples that are useful for understanding the detailed description, reference will now be made by way of example only to the accompanying drawings in which.

DETAILED DESCRIPTION

It would be desirable to have an apparatus that can use a biometric sensor to perform a security function but does not always have to use the biometric sensor to perform that security function. This is particularly advantageous if the performance of the security function without use of the biometric sensor consumes less energy or other resources than performance of the security function using the biometric sensor, as this will allow the apparatus to function in low-energy environments such as when an apparatus is worn by a subject, for example, as a wrist band. However, performing the security function without any conditionality may represent a security breach. It is therefore desirable for the security function to be performed without use of the biometric sensor only when it can be determined that the apparatus has not been moved to a different subject or removed from the subject after the initial performance of the security function using the biometric sensor. The examples below use a detector configured to detect one or more subject-dependent parameters to determine whether or not a condition is or is not satisfied before allowing performance of the security function without using the biometric sensor.

If the detected subject-dependent parameters are successfully verified then the security function may be performed without using the biometric sensor, however, if verification of the detected subject-dependent parameters is not successful then the security function may only be performed using the biometric sensor.

Figure 1:
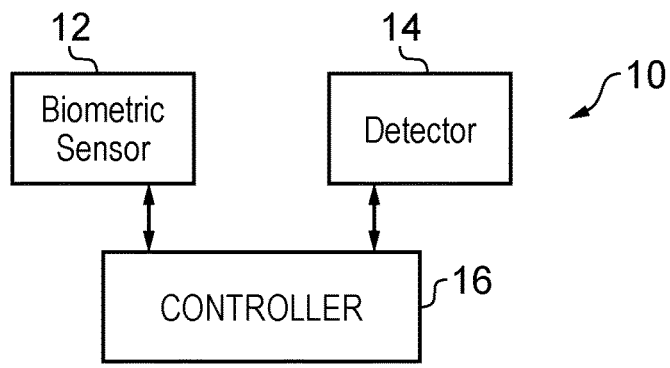
FIG. 1 illustrates an example of an apparatus, comprising a biometric sensor, and configured to perform a security function.

FIG. 1 illustrates an example of an apparatus 10 comprising: a biometric sensor 12 for sensing one or more biometric parameters of a subject; a detector 14 configured to detect one or more subject-dependent parameters; and a controller 16 configured to initially perform a security function using the biometric sensor and subsequently perform the security function, after successful verification of the detected subject-dependent parameters, without using the biometric sensor 12.

Figure 2:
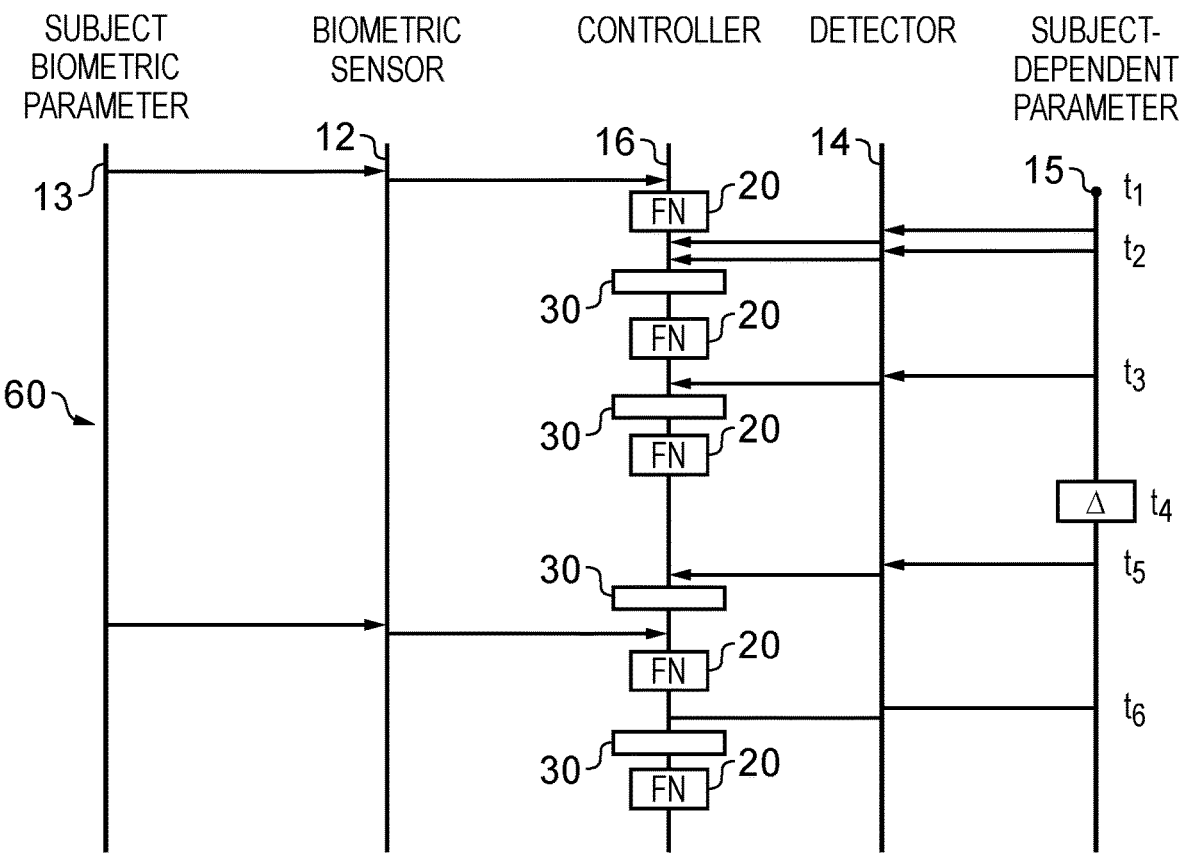
FIG. 2 illustrates an example of a method for performing a security function without using a biometric sensor.

The operation of the apparatus 10 may be understood by referring to FIG. 2. FIG. 2 illustrates an example of a method 60 for performing a security function 20 without using a biometric sensor 12. The method 60 comprises: enabling performance of a security function 20 by using a biometric sensor 12, for sensing one or more biometric parameters 13 of the subject; detecting one or more subject-dependent parameters 15; enabling performance of the security function 20 without using the biometric sensor 12 after successfully verifying the one or more subject-dependent parameters 15; and enabling performance of the security function 20 using the biometric sensor 12 after unsuccessfully verifying the one or more detected subject-dependent parameters 15.

FIG. 2 illustrates an example of operation of the controller 16, the biometric sensor 12 and the detector 14. At time t1 the controller 16 initially performs a security function 20 using the biometric sensor 12 to sense one or more biometric parameters 13. This successfully verifies the biometric signature of the subject.

At this stage, the controller 16 may detect and record the current subject-dependent parameters 15 detected by the detector 14 as reference parameters. The subject-dependent parameters 15 may, for example, be stored in a secure memory of a secure processing environment, for example, as specified in smartcard standards.

It may be assumed that if the detected subject-dependent parameters 15 at a subsequent time correspond to the reference parameters then the apparatus 10 is still attached to the same subject as at time t1 when the successful biometric signature verification occurred. While this is the case, the controller subsequently performs the security function 20, after successful verification 30 of the detected subject-dependent parameters 15, without using the biometric sensor 12. The verification involves matching the current detected subject-dependent parameters 15 with the stored reference subject-dependent parameters. Successful verification occurs when there is a match and unsuccessful verification occurs when there is not a match.

In FIG. 2, at time t2, and again at time t3, the controller 16 performs the security function 20, after successful verification 30 of the detected subject-dependent parameters 15, without using the biometric sensor 12.

At time t4, the apparatus 10 is removed from the subject and is either used in a removed state or is attached to a new subject. In any event, the current subject-dependent parameters 15 at time t4 will now be different from the reference parameters.

Subsequently, at time t5, the controller 16 attempts to perform the security function 20 without using the biometric sensor 12. However, the verification 30 of the detected subject-dependent parameters 15 fails because the current detected subject-dependent parameters 15 no longer match the reference parameters. The controller 16 does not therefore perform the security function 20 without using the biometric sensor 12. Instead, it either locks or, as in this example, performs the security function 20 using the biometric sensor 12 to sense one or more biometric parameters 13.

In the particular example of FIG. 2, time t5 corresponds to time t1 but with a different subject and the method may then continue as previously described. After the performance of the security function 20 using the biometric sensor 12 at time t5, the current subject-dependent parameters 15 may be stored as new reference parameters. Subsequently, at time t6, the controller 16 performs the security function 20 after successful verification of the detected subject-dependent parameters 15, without using the biometric sensor 12. The verification of the detected subject-dependent parameters 15 involves a comparison between the new reference parameters and the current detected subject-dependent parameters 15.

In some examples, a change in the subject-dependent parameters 15 at any time after the original performance of the security function 30 using the biometric sensor 12, will prevent performance of the security function 20 without using the biometric sensor 12. In examples where the security function 20 can still be performed, it must then be at least initially performed using the biometric sensor 12. In this scenario, if a subject were to remove the apparatus 10 from their body and then replace the apparatus 10 to their body, the controller 16 would use the biometric sensor 12 when performing the security function 20 after replacement.

In another example, the controller 16 is only concerned with the subject-dependent parameter 15 at the time at which it wishes to perform the security function 20. If at that time the verification 30 is successful and the subject-dependent parameters 15 detected by detector 14 match the reference parameters, then performance of the security function 20 without using the biometric sensor 12 is enabled. This would then allow a subject to remove the apparatus 10 from their body and subsequently replace the apparatus 10, and after replacement use the apparatus 10 to perform the security function 20 without using the biometric sensor 12. However, if the apparatus were instead to be placed on the body of a different subject then if the security function 20 could be performed, it could only be performed using the biometric sensor 12.

In this example, the energy required to perform the security function 20 once using the biometric sensor 12 is greater, in this example, than the power required to detect and verify, once, the one or more subject-dependent parameters 15 and subsequently perform the security function 20 once without using the biometric sensor 12. There is, therefore, an energy saving gained by performing the security function 20 using the biometric sensor 12 once and then subsequently performing the security function 20 without using the biometric sensor 12.

The security function 20 may, for example, be authentication (assured identification) of the subject.

The security function 20 may involve wireless communication with a remote device using a suitable wireless communication protocol such as near field communication, Bluetooth, Bluetooth LTE, wireless LAN, etc.

Figure 3:
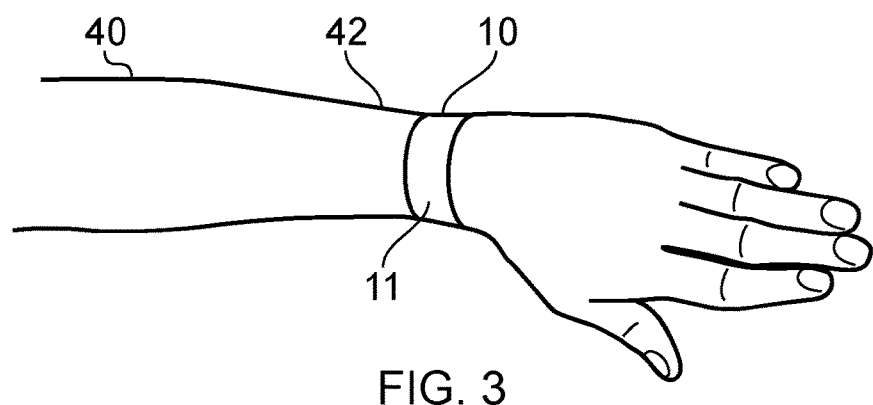
FIG. 3 illustrates an example of the apparatus conforming to a part of a body of the subject.

FIG. 3 illustrates an example of the apparatus 10 being worn by a subject 40. The apparatus 10 is a wearable apparatus fixed to a body part 42 of the subject 40 by circumscribing (closely surrounding) the body part 42 and the one or more subject-dependent parameters 15 are dependent on the size and shape of the circumscribed body part 42. The detected subject-dependent parameters 15 are therefore a weaker biometric signature than the biometric signature detected by the biometric sensor 12.

The apparatus 10 has a housing 11 conformable to a body part 42 of a subject 40. In this example, the housing 11 is a band that wraps around a wrist of a subject (a wrist band).

The detector (not illustrated in this figure) is configured to detect at least a change in a subject-dependent conformance of the housing 11.

Figure 4A:
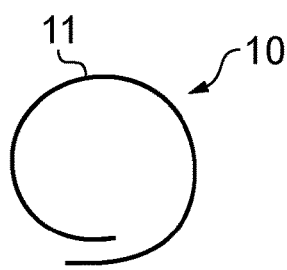
FIGS. 4A, 4B and 4C illustrate different physical configurations of a housing of the apparatus.
Figure 4B:
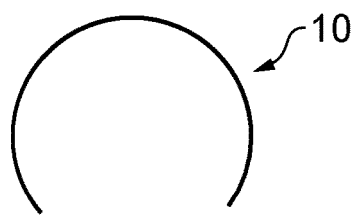
Figure 4C:
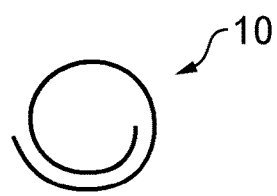

FIGS. 4A, 4A and 4C illustrate different configurations of the housing 11. In FIG. 4A, the housing 11 is wrapped around a body part of a first subject circumscribing the body part wholly tor sufficiently to prevent its removal in this configuration. In FIG. 4B the housing 11 has been at least partially unwrapped to enable its removal from the body part of the first subject in this configuration. In FIG. 4A, the housing 11 is wrapped around a body part of a second subject circumscribing the body part wholly or sufficiently to prevent its removal in that configuration. It will be appreciated that the conformance of the housing 11 to a wrist of a subject 40 is subject-dependent.

In FIG. 4a, the housing 11 has a larger girth wholly or partially circumscribing a larger area than in FIG. 4C. In FIG. 4a, the girth (wholly of partially circumscribing length conforming to the body part of the subject) of the housing 11 is dependent upon the size and shape of the subject's body part (e.g. wrist) and in FIG. 4A it is larger than in FIG. 4C.

The controller 16 is configured to initially use the biometric sensor 12 for the security function 20 when the housing 11 conforms to the body part 42 of the subject 40 and subsequently to perform the security function 20 without use of the biometric sensor 12 while the housing 11 conforms to the body part 42 of the subject 40. The controller 16 is configured to use the biometric sensor 12 for the security function 20 subsequently if the detector 14 detects a change in the subject-dependent conformance of the housing 11 such as, for example, a change in shape, a change in length, a change in curvature.

The housing 11 is physically adaptable externally to shape of a body part 42 of a subject 40 and the detector 14 is configured to detect a change in an external physical adaptation of the housing 11 to the subject. A detector 14 may, for example, detect a girth/length of a wrist band that is in contact with the wrist 42 of the subject or the extent of overlap between a portion of the wrist band that does not contact the wrist of the subject and a portion of the wrist band that is in contact with the wrist of the user, and/or a curvature of the wrist band.

Figure 5:
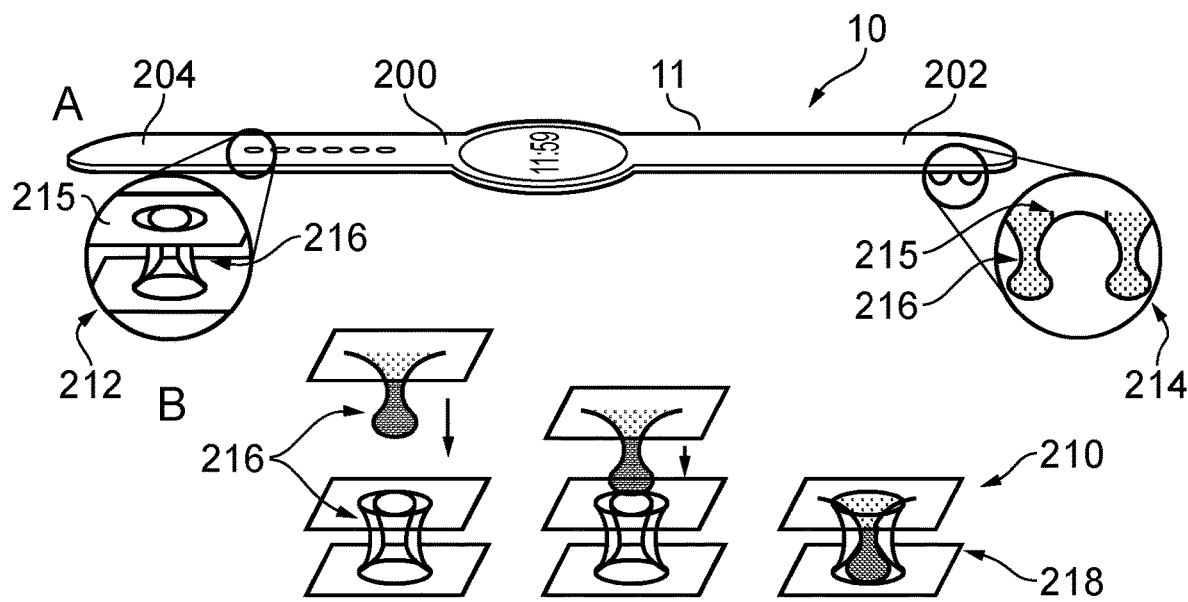
FIG. 5 illustrates an example of the apparatus.

FIG. 5 illustrates an example of the apparatus 10 configured as a wrist band which is a wearable apparatus. In this example, the wrist band has two ends that are separate and are closed together by a subject-selected closure arrangement 210 that conforms the wrist band to the wrist of the subject. However, in other examples the wrist band may be a single piece without ends and a subject-selected closure arrangement 210 may change the wrist band girth conforms the wrist band to the wrist of the subject.

The housing 11 of the apparatus 10 forms a wrist band that has a plurality of different closure arrangements 210. Each closure arrangement 210 defines a different size/length of the wrist band. By selecting a particular closure arrangement 210, the subject is able to attach the apparatus 10 to their wrist in a manner that is neither too tight nor too loose so that it conforms to their wrist.

The identification of which closure arrangement 210 is used to attach the apparatus 10 to a wrist of a subject is a subject-dependent parameter 15.

It may also be desirable to detect additional subject-dependent parameters 15 such as, for example, the curvature of the housing 11 of the apparatus 10.

The detector 14 is configured to detect which of multiple subject electable closure arrangements 210 is used and/or a curvature of the housing 11 of the apparatus 10.

In FIG. 5, a wrist strap 200 comprises a right portion 202 and a left portion 204. The wrist strap 200 has a plurality of closure arrangements 210 which enable the left-hand portion 204 of the strap 200 to be interconnected to the right-hand portion 202 so that the girth of the circumscribing band formed conforms to a wrist of the subject.

In this example, the left-hand portion 204 comprises a plurality of distinct first couples 212 which are linearly arranged and the right-hand side 202 comprises one or more second couples 214 for engagement with a first couple 212 to form a closure arrangement 210. In this example, the first couples 212 are openings in the strap 200 and the second couples 214 are projections from the strap 200 which are sized to be received in and retained by an opening in the strap 200. However, in other arrangements, the first couple 212 and the second couple 214 may be implemented using one or more magnets and a ferromagnetic material to form a magnetic clasp.

In the example illustrated, the opening 212 forming the first couple is partially or fully covered with a conducting surface 216 and the adjacent openings 212 are electrically insulated from each other by insulator 215. Likewise, the projection(s) 214 forming the second couples are also fully or partially covered with a conducting surface 216 and where multiple projections 214 are used they may be electrically isolated by insulator 215.

The formation of a closure arrangement 210 is illustrated in more detail in the lower portion of the figure. The projection 214 forming the second couple is received in the opening 212 forming the first couple. This brings the conducting surface 216 of the first couple 212 and the conducting surface 216 of the second couple 214 into contact, closing an electrical circuit. The projection 214 forming a second couple is sized to be retained by the opening 212 forming the first couple and this friction fit forms the closure arrangement 210.

Figure 6:
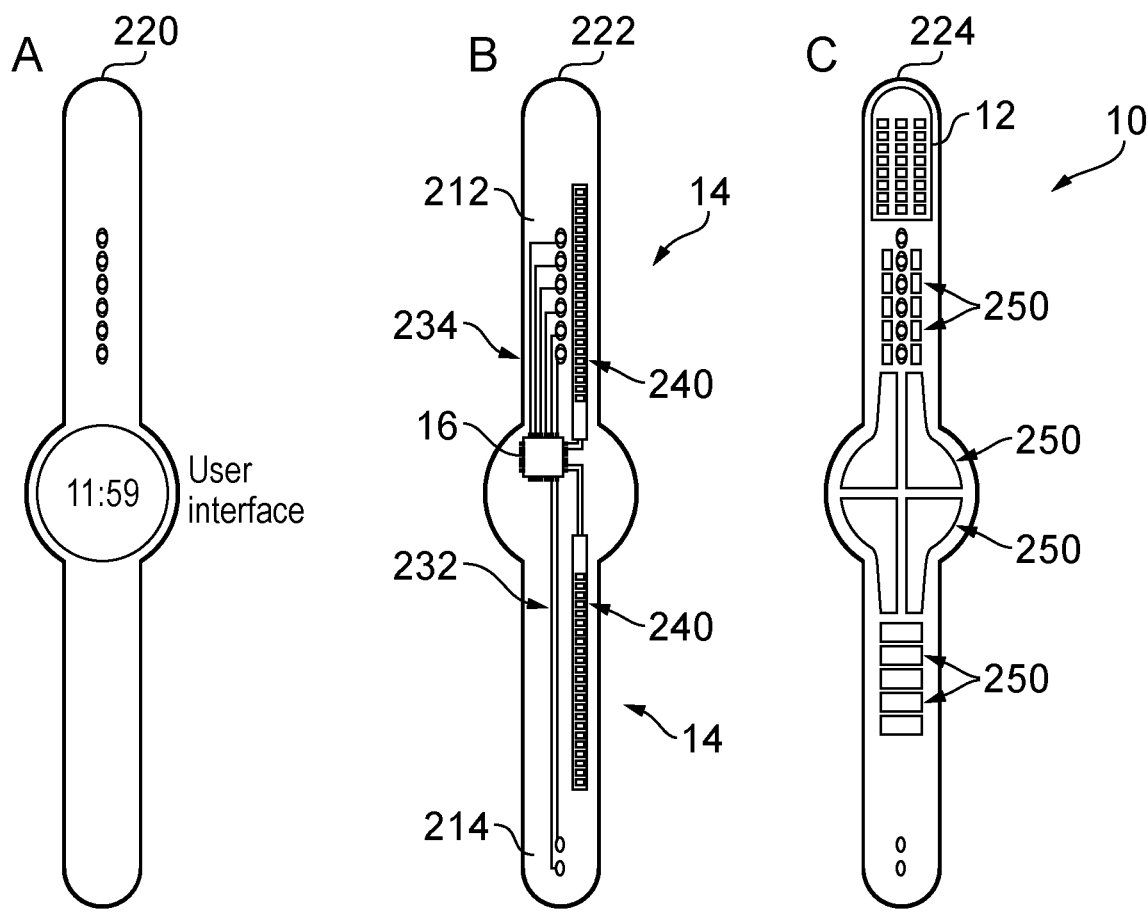
FIG. 6 illustrates an example of components of an example of the apparatus.

FIG. 6 illustrates the example apparatus 10 illustrated in FIG. 5 and its component parts. The apparatus 10 has been separated into three distinct layers for the purposes of illustration. The layers include a front layer 220, an internal layer 22 and a back side layer 224. The layer 222 provides the electronic circuitry of the apparatus 10. The apparatus 10 comprises a controller 16, one or more detectors 14 and a biometric sensor 12.

In this example, the controller 16 is separately interconnected to each of the openings 212 forming the first couples by a separate conductive line 234 and is separately interconnected to each of the projections 214 forming a second couple by a separate second signal line 232. The formation of a particular closure arrangement 210 is detected by determining which of the first couple 212/conductive line 234 and the second couple 214/conductive line 232 form the closure arrangement 210. The physical separation between the first couple 212 and the second couple 214 used in the closure arrangement 210 defines a girth/length of the housing 11 circumscribing the wrist 42 of the subject 40.

In this example, the detector 14 is also configured to detect bending of the housing 11 of the apparatus 10. In this example, flexible resistors 240 are used to detect the extent of bending, although other detectors such as piezoelectric devices may be used. The flexible resistors or piezoelectric devices change their electrical properties depending on how much they are bent and this change in electrical properties may be detected by the controller 16.

In this example, the back side of 224 of the apparatus 10 comprises part of the biometric sensor 12 and, in addition, comprises a plurality of loss-of-contact sensors 250. The sensors 250 and the biometric sensor 12 are interconnected to the controller 16. The loss-of-contact sensors 250 may be used to detect when the apparatus 10 becomes separated from a subject. Examples of suitable loss of contact sensors 250 are temperature detectors, touch detectors, capacitance detectors. The loss-of-contact may be used as an additional condition used by the controller 16 to determine whether to perform the security function, after successful verification of the one or more detected subject-dependent parameters, without using the biometric sensor. The controller 16 may, for example, enable performance of the security function without using the biometric sensor only after successful verification of the one or more detected subject-dependent parameters and if there has been no loss of contact since performance of the security function using the biometric sensor. This in some examples, if the loss of contact of the apparatus 10 from the subject 40 is detected then the security function 20 may only be performed next using the biometric sensor 12.

Figure 7:
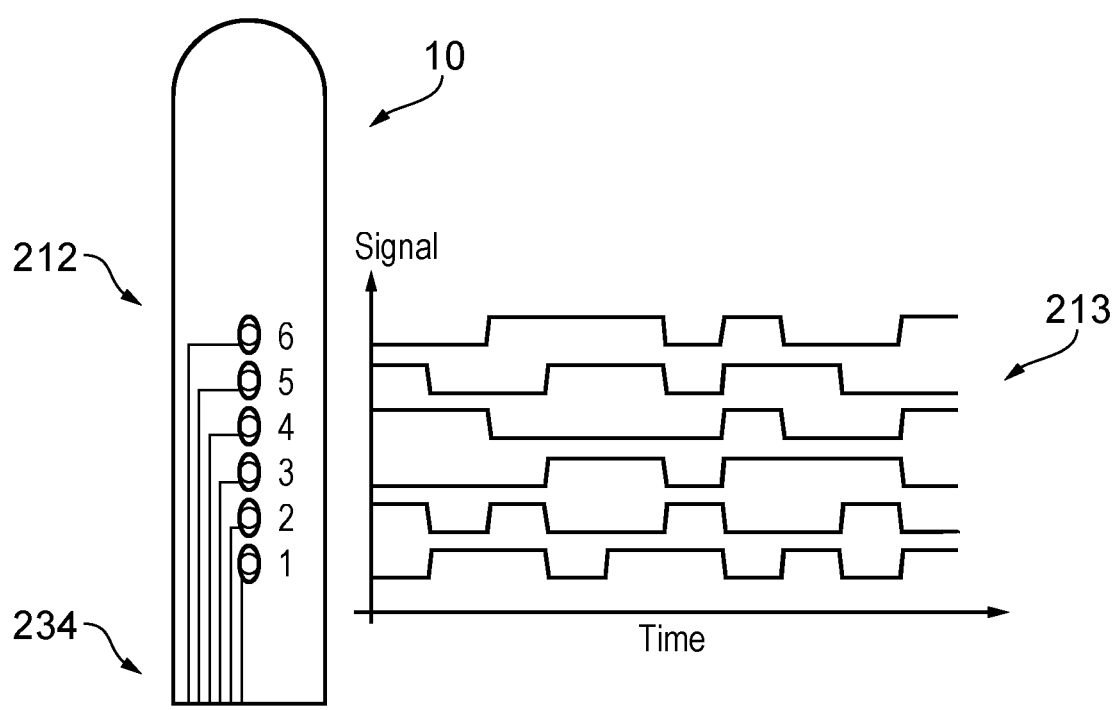
FIG. 7 illustrates an example of test signals used in the example of the apparatus illustrated in FIGS. 5 and 6.

FIG. 7 illustrates an example of test signals 213 that may be sent by the controller 16 to the first couples 212 via conductive lines 234 and received at the controller 16 via conductive contact at a particular closure arrangement 210, and the second couple 212 and conductive line 234 associated with that particular closure arrangement 210. In this example, each of test signals 213 applied to a different one of the first couples 212 has a different modulation that is specific to the first couples 212 but random. It is not, therefore, possible to use a signal provided to one of the first couples 212 to impersonate a signal from a different one of the first couples 212. The controller 16 knows which random modulations are used for which of the first couples 212 and detects the subject-dependent parameter 15 based on which modulation is detected at the signal received at the controller 16 via the second couple 214 of the closure arrangement 210.

Implementation of a controller 16 may be as controller circuitry. The controller may be implemented in hardware alone, have certain aspects in software including firmware alone or can be a combination of hardware and software (including firmware).

The controller may be implemented using instructions that enable hardware functionality, for example, by using executable instructions of a computer program in a general-purpose or special-purpose processor that may be stored on a computer readable storage medium (disk, memory etc) to be executed by such a processor.

The processor may be configured to read from and write to the memory. The processor may also comprise an output interface via which data and/or commands are output by the processor and an input interface via which data and/or commands are input to the processor.

The memory may store a computer program comprising computer program instructions (computer program code) that controls the operation of the apparatus 10 when loaded into the processor. The computer program instructions, of the computer program, provide the logic and routines that enables the apparatus to perform the methods illustrated in FIG. 2. The processor by reading the memory is able to load and execute the computer program.

The apparatus 10 may therefore comprises: at least one processor; and at least one memory including computer program code the at least one memory and the computer program code configured to, with the at least one processor, cause the apparatus at least to perform:

causing performance of a security function by using a biometric sensor, for sensing one or more biometric parameters of a subject; and causing performance of the security function without using the biometric sensor after successfully verifying one or more detected subject-dependent parameters.

The computer program may arrive at the apparatus 10 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program. The apparatus may propagate or transmit the computer program as a computer data signal.

The memory may be a single component/circuitry or it may be implemented as one or more separate components/circuitry some or all of which may be integrated/removable and/or may provide permanent/semi-permanent/dynamic/cached storage.

The processor may be a single component/circuitry or it may be implemented as one or more separate components/circuitry some or all of which may be integrated/removable. The processor may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The processes illustrated in the FIG. 2 may represent operations in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   at least one processor; and
   at least one memory including computer program code, where the at least one memory and the computer program code are configured, with the at least one processor, to cause the apparatus to at least:
   sense with a biometric senor one or more biometric parameters of a subject;
   initially perform a security function using the biometric sensor;
   detect one or more subject-dependent parameters to verify whether there is a change of at least a configuration of a band associated with the biometric sensor; and
   enable the apparatus to subsequently perform the security function without using the biometric sensor based on successful verification of no change of at least the configuration of the band.

2. An apparatus according to claim 1, wherein the at least one memory including the computer program code is configured with the at least one processor to cause the apparatus to at least one of: after removal and replacement of the apparatus from the subject, perform the security function, after successful verification of the one or more detected subject-dependent parameters, or
   after removal and replacement of the apparatus from the subject, perform the security function, after successful verification of the one or more detected subject-dependent parameters, without using the biometric sensor, or
   perform the security function, without using the biometric sensor only while the one or more subject-dependent parameters do not change.

3. An apparatus according to claim 1, wherein energy required to initially perform the security function using the biometric sensor is greater than the energy required to detect and verify, once, the one or more subject-dependent parameters and subsequently perform the security function after successful verification of no change of at least the configuration of the band, without using the biometric sensor.

4. An apparatus according to claim 1, wherein the security function comprises authentication of the subject.

5. An apparatus according to claim 1, wherein the biometric sensor comprises a housing conformable to a body part of a subject, wherein the housing comprises the band, and wherein the successful verification of no change of at least a configuration of the band is based at least a verification of no change of a conformance of the housing to the body part of the subject.

6. An apparatus according to claim 5, wherein the at least one memory including the computer program code is configured with the at least one processor to cause the apparatus to:
   initially perform the security function using the biometric sensor while the housing does not conform to the body part of the subject and subsequently perform the security function without use of the biometric sensor while the housing conforms to the body part of the subject.

7. An apparatus as claimed in claim 5, wherein the housing is configured to be physically adaptable externally to a shape of a body part of a subject and wherein the successful verification of no change of at least a configuration of the band is based on verification of no change in a conformance of the housing by detecting no change in an external physical adaptation of the housing to the subject.

8. An apparatus according to claim 5, wherein the band is configured to attach the apparatus to a wrist of the subject, wherein the successful verification of no change of at least a configuration of the band is based on verification of no change in a shape of the band.

9. An apparatus according to claim 1, wherein the successful verification of no change of at least a configuration of the band is based on verification of no change in a length of the band.

10. An apparatus according to claim 5, wherein the band is configured to attach the apparatus to a wrist of the subject, and wherein the successful verification of no change of at least a configuration of the band is based on no change in a curvature of the band.

11. An apparatus according to claim 1, configured as a wearable apparatus that has been fixed to a body of the subject.

12. An apparatus according to claim 1, wherein the band comprises a closure arrangement, wherein the successful verification of no change of at least a configuration of the band is based on no change of a configuration of the closure arrangement.

13. An apparatus according to claim 5, wherein the housing comprises flexible resistors to detect a change of at least the configuration of a band.

14. A method comprising:
sensing with a biometric sensor one or more biometric parameters of a subject;
initially performing a security function using the biometric sensor;
detect one or more subject-dependent parameters to verify whether there is a change of a configuration of a band associated with the biometric sensor; and
enabling subsequent performance of the security function without using the biometric sensor based on successful verification of no change of at least a configuration of the band.

15. A method according to claim 14 wherein the biometric sensor comprises a housing, wherein the housing comprises the band, and wherein the successful verification of the configuration of no change of the band is based on at least one of no change of a shape or a curvature of at least one of the band or the housing.

16. An apparatus according to claim 5, wherein the verifying conformance of the housing is using at least one of a temperature detector, touch detector, capacitance detector.

17. A method according to claim 14 wherein the verifying no change of at least a configuration of the band is using loss-of-contact sensors to detect when the apparatus becomes separated from a subject.

18. A method according to claim 14 comprising: enabling a plurality of loss-of-contact sensors to be used as an additional condition whether to perform the security function.

19. A method according to claim 14 comprising: the security function involving wireless communication with a remote device using a wireless communication protocol comprising one of: a near field communication, Bluetooth, Bluetooth LTE, wireless LAN.

20. A non-transitory computer readable medium comprising program instructions stored thereon for:
performing at least sensing using a biometric sensor to sense one or more biometric parameters of a subject;
initially performing a security function using the biometric sensor;
detecting one or more subject-dependent parameters to verify whether there is a change of a configuration of a band associated with the biometric sensor; and
enabling subsequent performance of the security function without using the biometric sensor based on successful verification of no change of configuration of the band associated with the biometric sensor.

* * * * *